Oct. 12, 1965  G. W. PEARCE  3,211,086
FROZEN BLOCK SIZING APPARATUS
Filed Nov. 6, 1962  6 Sheets-Sheet 1
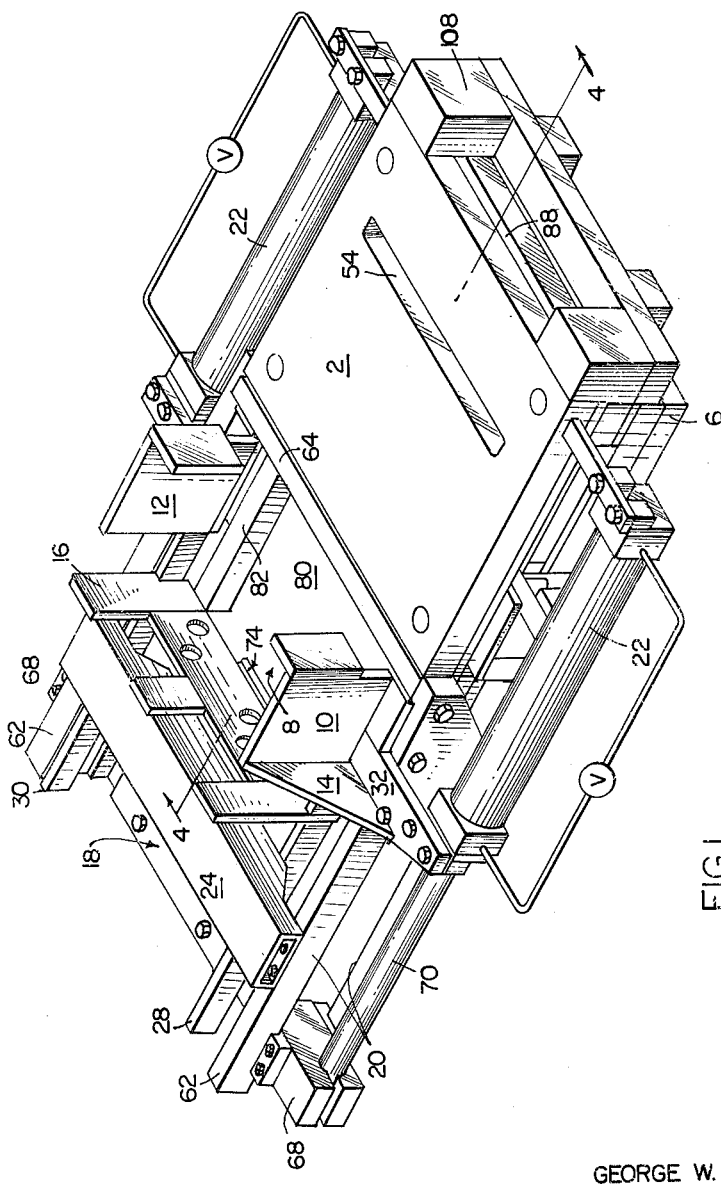
INVENTOR.
GEORGE W. PEARCE
BY
ATTORNEY Oct. 12, 1965  G. W. PEARCE  3,211,086
FROZEN BLOCK SIZING APPARATUS
Filed Nov. 6, 1962  6 Sheets-Sheet 2
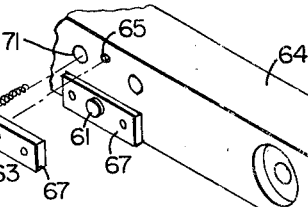
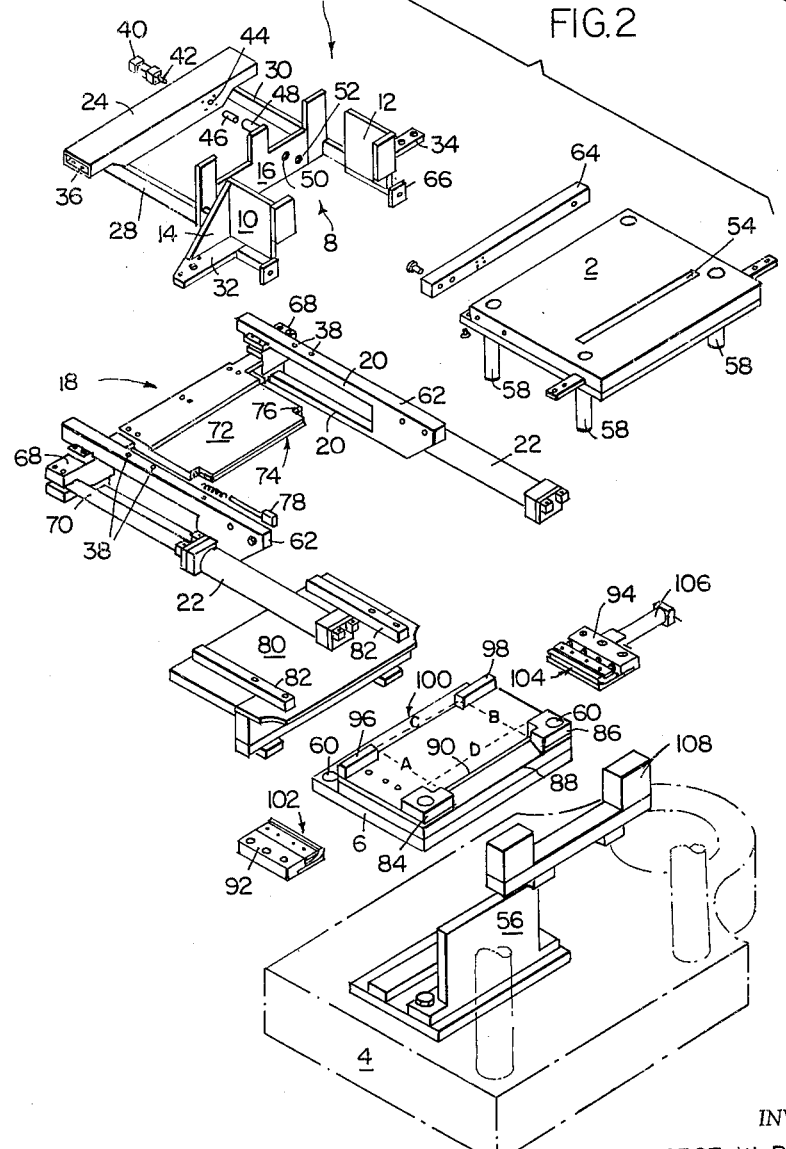
INVENTOR.
GEORGE W. PEARCE
BY
ATTORNEY Oct. 12, 1965

G. W. PEARCE 3,211,086

FROZEN BLOCK SIZING APPARATUS

Filed Nov. 6, 1962

INVENTOR.
GEORGE W. PEARCE
BY
ATTORNEY

Oct. 12, 1965    G. W. PEARCE    3,211,086
FROZEN BLOCK SIZING APPARATUS
Filed Nov. 6, 1962    6 Sheets-Sheet 4

INVENTOR
GEORGE W. PEARCE
BY,
ATTORNEY

Oct. 12, 1965
G. W. PEARCE
3,211,086
FROZEN BLOCK SIZING APPARATUS
Filed Nov. 6, 1962
6 Sheets-Sheet 6
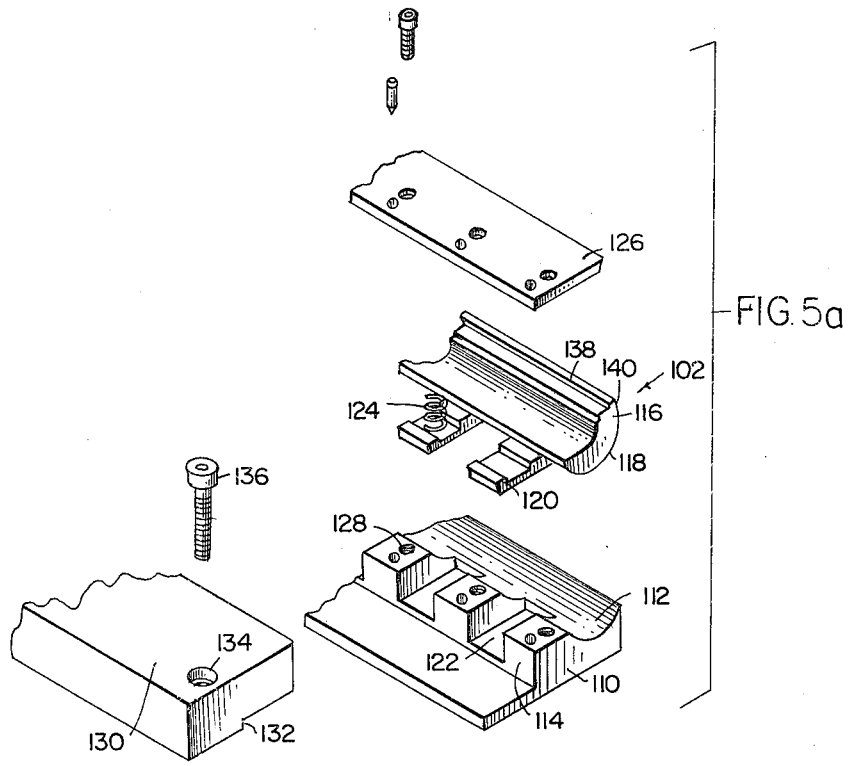
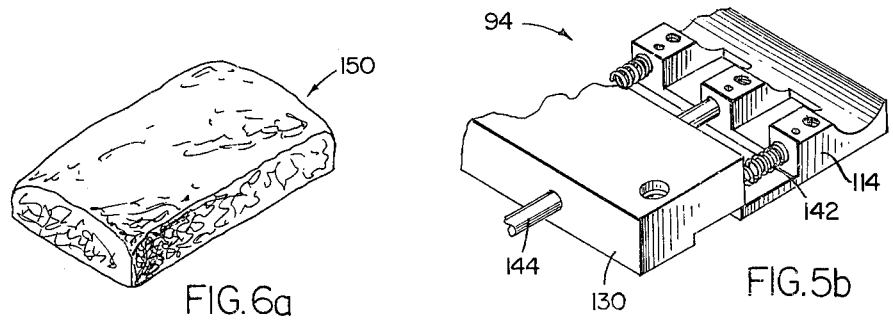
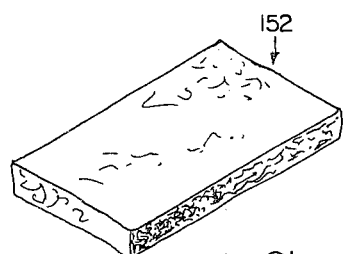
FIG.6a
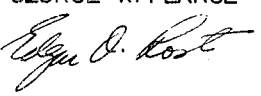
FIG.6b
INVENTOR.
GEORGE W. PEARCE
BY
ATTORNEY United States Patent Office 3,211,086
Patented Oct. 12, 1965

3,211,086
FROZEN BLOCK SIZING APPARATUS
George W. Pearce, 98 Collins St., Danvers, Mass.
Filed Nov. 6, 1962, Ser. No. 235,785
3 Claims. (Cl. 100—215)

The present invention relates to the preparation of food products and, more particularly, to novel apparatus and a method for the accurate sizing of blocks of frozen edible foods preparatory to further processing in the preparation of packaged food products.

In the food processing industry it is common to prepare quantities of edible products in the frozen state for packaging and distribution to processing plants located in distant areas. Variations between individual frozen blocks results in considerable waste in the processing plants. It is, further, difficult to accurately control the individual portions of the final food product as they proceed through the processing operation before consumer packaging. Irregularities in the forms utilized in the initial freezing operation, as well as, expansion due to freezing has accounted for much of the variation of the frozen food blocks received at the processing location. To circumvent such difficulties and to accurately control the dimensions of the frozen blocks, the present invention has for its primary object the provision of a new and novel process for the sizing of frozen food blocks to an accurate dimension predetermined in relation to the desired end product and the apparatus for the implementing of said process.

Briefly, the invention discloses apparatus for the sizing of an irregularly formed frozen block by means of the application of compressive forces and the utilization of a die member having side and end wall sealing members disposed therein to provide for the reducing of certain specified dimensions and enlargement of others. In addition, the apparatus provides for the accurate sizing of the frozen blocks predetermined dimensions which will yield a predetermined number of end products with a minimum of waste. Since the net weight of the final food package for the consumer must be carefully controlled, the apparatus herein disclosed will facilitate more accurate control than heretofore possible with prior art techniques.

Other objects, features and advantages will be apparent after consideration of the following detailed description and accompanying drawings, wherein:

FIG. 1 is a perspective view of the illustrative embodiment of the invention;

FIG. 2 is an exploded view of the principal components thereof; and FIG. 2a is an exploded fragmentary view of a sub-assembly;

Figure 4:
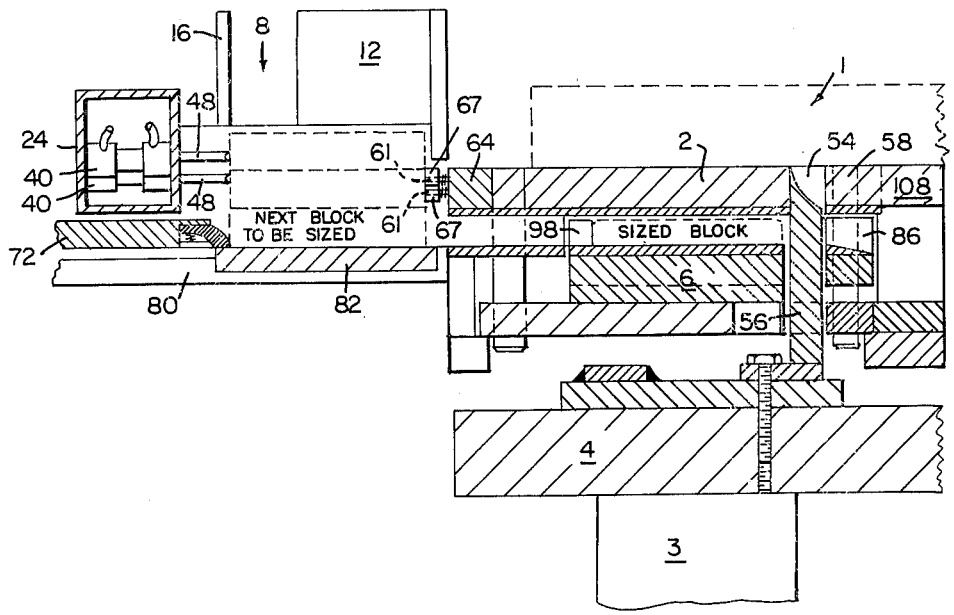
Figure 4A:
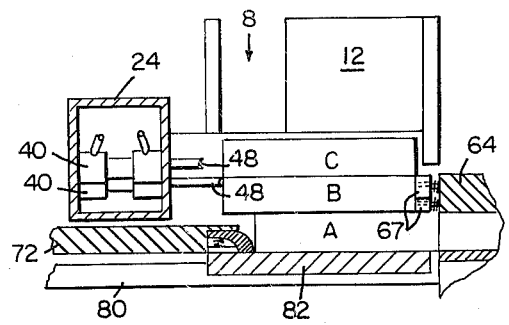

FIGS. 4a, b, c and d are fragmentary views of the apparatus shown in FIG. 4 illustrative of the sequence of operation of the block feeding mechanism of the invention;

FIG 4 is a cross-sectional view along the line 4—4 in FIG. 1 and adjacent portions of the press frame structure;

FIGS. 5a and 5b are exploded views of the wall members and sealing assembly; and FIGS. 6a and 6b are perspective views of a frozen block before and after sizing in accordance with the teachings of the invention.

Description of apparatus

Referring to FIG. 1 the structure illustrated is mounted on a conventional press capable of providing pressures up to approximately 1000 pounds per square inch. Upper die member 2 abuts the stationary portion 1 of the press which is of conventional design and has been partially illustrated, while lower die member 6 is contacted by the movable platen member 4 of the press affixed to movable piston 3. The upper and lower die members 2 and 6 define the top and bottom walls which together with side and end wall members define a three-dimensional cavity for the accurate sizing of the frozen blocks on which the invention is to be practiced. A plurality of blocks are introduced into a hopper 8 defined by side members 10 and 12 supported by brackets 14 and a fixed end member 16. A sliding carriage assembly, shown generally at 18, supported by tracks 20 is moved horizontally by means of air actuating members 22. A hollow cross-bracing member 24 is secured to the upper portion of tracks 20 and encloses the block gripping mechanism to be described hereinafter.

Attention is now directed to the exploded view in FIG. 2 wherein individual components and sub-assemblies of the overall embodiment will be described. The hopper sub-assembly 26 comprises two parallel bars 28 and 30 with side members 10 and 12 and end members 16 secured thereto. Triangular plates 32 and 34 are provided with holes adjacent the ends thereof for the introduction of bolts or screws for securing the sub-assembly to a series af mating holes disposed in abutting structure. In a like manner a plurality of holes 36 are provided adjacent the ends of cross-bracing members 24 to mate with matching holes 38 in U-shaped track members 62. Wholly supported within the crossbracing member 24 are a plurality of air actuating cylinders 40, one of which is shown in this view. Plunger rod 42 extends through aperture 44 and a sleeve 46 mounted therein. The end of the plunger rod is connected to a cylindrical member 48 having a slightly curved indentation adjacent the end thereof to provide for positive gripping action on the frozen blocks to be contacted. Cylindrical member 48 extends into aperture 50 in end member 16 and a similar arrangement will provide for gripping action by means of aperture 52 disposed in offset array. A similar series of gripping mechanisms will be disposed in a like arrangement adjacent to parallel bar 28.

Transverse bar 64 is joined to flanges 66 disposed at the ends of side bars 28, 30 and the upper die member 2. A plurality of fixed gripping members are disposed on the side of bar 64 facing hopper 8 to engage an opposing side of each frozen block upon activating of the cylinders 40. As shown in FIG. 2a each gripping member is provided with a cylindrical cup member 61 anchored within threaded hole 65. A clearance hole 63 in plate 67 is provided to expose the indented end portion of cup member 61. Plate 67 is secured to bar 64 by means of pins 69 introduced in holes 71 with a spring disposed therein.

Upper die member 2 is provided with a transverse slot 54 to provide for the passage of a gate 56 secured to the movable press platen 4. A plurality of locating pins 58 are provided to mate with matching holes 60 disposed in the lower die member 6.

Referring next to the sliding carriage assembly 18, the individual components thereof will be described. The U-shaped track member 62 defines the opposing tracks 20. Blocks 68 coupled by means of rods to the air actuating members 22 support the pusher member 72 which contacts one side of the frozen block and controls the movement of the block through the sizing cavity. The forward wall of the pusher 72 is provided with a pressure seal assembly 74 which will be described in the ensuing discusion with relation to FIGS. 5a and 5b herein. Notches 76 are provided to receive a spring actuated stop arrangement 78. Flat plate member 80 provides parallel guides 82 which contact the lower portion of pusher 72 and serve to guide and support same during the horizontal travel of the sliding carriage assembly. Plate member 80 abuts the upper and lower die members with provision for satisfactory clearance for the pins 58 in holes 60.

Referring now to the lower die member 6, the internal structure of the overall sizing cavity will be described. Since the illustrative frozen food blocks on which the embodiment of the invention may be practiced are rectangular, the cavity composed of the upper and lower die members together with end and side wall members will conform to this configuration. On opposing corners along one of the longer sides L-shaped corner blocks 84 and 86 define a discharge opening 88, as well as clearance holes 60 for the introduction of the pins 58 disposed on the upper die member. Adjacent the discharge opening 88 is a transverse slot 90 to provide for the introduction of gate 56 disposed on platen member 4 with the upper end of the gate entering the slot 54 provided in the upper die member 2. Along opposing short sides of the die member 6 are disposed the end wall members 92 and 94. Positioning blocks 96 and 98 disposed along the remaining long side of the die member provide for the retension of the end wall members, as well as the defining of an entrance slot 100 through which the frozen block to be dimensioned is introduced within the sizing cavity. End wall member 92 is permanently secured between positioning block 96 and corner block 84 and bears on its inner surface pressure seal assembly 102 which is aligned along the dotted line indicated by the letter A. The opposing end wall member 94 bears on its inner surface a similar pressure seal assembly 104 which is movably supported with respect to the opposing assembly and is secured with its inner end disposed along the dotted line indicated by the letter B.

Since the sizing operation within the die member results in reduction of the frozen block in height, as well as in width, enlargement will result in the longitudinal dimension which abuts the movable pressure seal assembly 104. Air actuated member 106 assists in the application of the pressure along this end of the sizing cavity to limit the growth of the frozen block along this dimension. The pressure seal assembly 74 of pusher 72 completely encloses the slot 100 and stops 78 contact positioning blocks 96 and 98 to prevent any leakage of the food product along the side wall during the sizing operation. The positioning of the pressure seal assembly 74 is indicated generally by the dotted line and letter C while the position of the gate 56 after insertion is indicated by the dotted line and letter D to thereby provide the side walls of the overall cavity. The approximate dimensions of a sized block after release of the pressures and commencement of the discharge operation is thereby indicated by the four dotted lines. Bracing member 108 abuts the discharge end of the die members and defines structure permanently secured to the upper die member.

A detailed description of the structure of the end wall and pusher members together with the pressure seal assembly follows, reference being directed to FIGS. 5a and 5b. In FIG. 5a an exploded view of the wall member 92 is shown. Base portion 110 defines a continuous arcuate portion 112 and a plurality of spaced raised portions 114. A rocker 116 defines an arcuate portion 118 mating with the similar surface 112 in the base portion 110. Arms 120 are secured to the rear side of the rocker and are positioned in the spaces between the raised portions 114, indicated by the numeral 122. Springs 124 contact arms 120 and cover plate 126 which is secured by means of the threaded holes 128 in the raised portion 114. A back member 130 having a substantially reverse L-shaped configuration defines a ridge 132 against which the rear side of base member 110 is positioned. The entire end wall member is secured to the lower die member surface by means of tapped holes 134 and recessed set screws 136. The forward edge of the rocker defines adjacent flat surfaces 138 and 140 to define a right angle. As the upper and lower die members are compressed the rocker 116 will be moved in such a manner that the upper surface 138 contacts the underside of the upper die member 2 while the remaining flat surface 140 comes in contact with the frozen block under compression within the cavity. The arms 120 move uwardly and after the sizing operation is completed springs 124 return the rocker to its original position.

In FIG. 5b a substantially similar arrangement is shown, however, in this embodiment springs 142 are disposed between the back member 130 and the raised portions 114 of the base 110. Air acutating member 106 bearing a rod 144 urges the assembly 104 towards the sizing cavity. As the frozen block is compressed and enlarges in the area of the movable member 94, the rocker will move in the same manner and the expansion of the block will be taken up by movement of the base portion 110 towards the back member 130. The pressure seal assembly, indicated generally by the numeral 74, of the pusher 72 is constructed in essentially the same manner, however in this instance one right angular surface of the rocker engages the surface of plate member 80 as the pusher moves horizontally.

Figure 3:
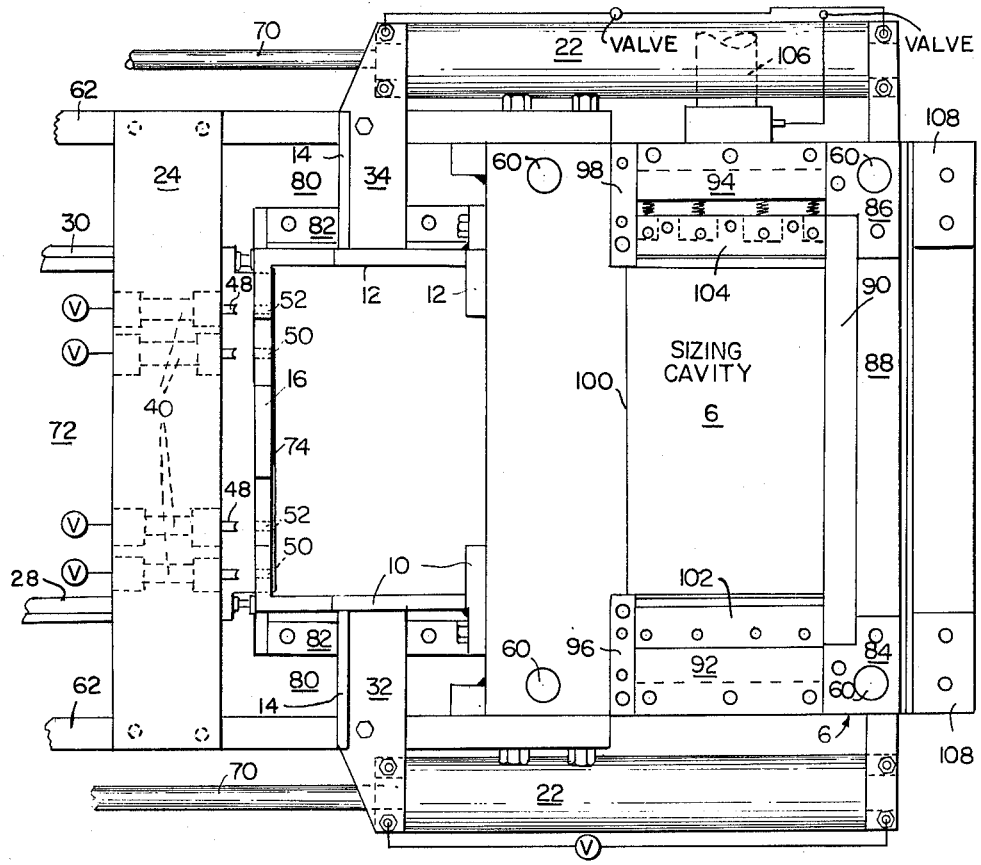
FIG. 3 is a plan view of the sizing cavity and feeding arrangement with the superimposed structure removed.
Figure 4B:
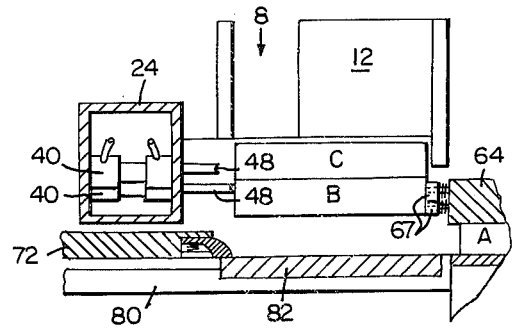
Figure 4C:
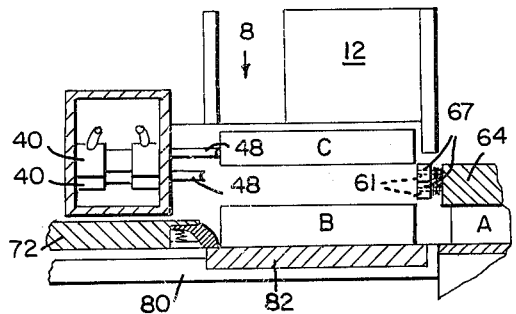
Figure 4D:
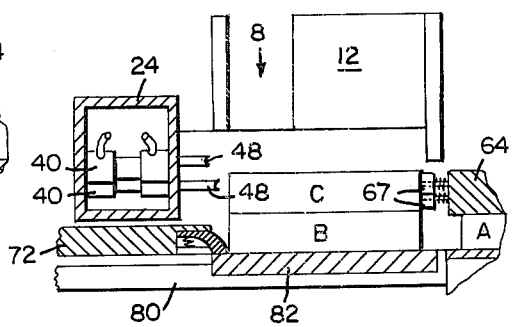

FIG. 3 is a view of the overall embodiment with the upper die member removed to reveal the inner structure of the sizing cavity and wall sealing members. In this view the pusher has been retracted to its original starting position. In FIG. 4 a cross-sectional view of the die member in a partially closed position is shown, as well as a partial view illustrating the reverse mounting of the pressure seal assembly 74. A sized block is shown in dotted lines within the area defined by the positioning block 98 and gate 56. As soon as the press platen 4 moves downward so that the gate 56 will clear the end of the sizing cavity, the pusher will start the next block into the cavity for sizing. FIGS. 4a, b, c and d illustrate the complete sequence of the feeding operation of the blocks from the hopper 8 to the sizing cavity. Upon actuation by appropriate timing mechanisms the cylinders 40 at the lower level urge members 48 in contact with block B and also hold same against cup members 61 on the other side. Block A meanwhile is being introduced into the cavity for sizing by the pusher assembly 72. In FIG. 4b the block A is being sized while the pusher assembly is retracted to pick up the next block indicated as block B. Lower members 48 retract to release the block B while upper members 48 engage the side of Block C to hold same against the side of the member 12. Block B then drops into position as shown in FIG. 4c. The pusher assembly then picks up the block B and in pushing same through the cavity block A is ejected. In the next position shown in FIG. 4d the lower gripping members 48 again come forward to engage the side of the next block and the sequence commencing with FIG. 4a is repeated. The overall operation of the apparatus disclosed herein illustrative of the method of the invention will now be described reference being directed to FIGS. 6a and 6b.

Operation of apparatus

An irregularly formed frozen block of a food product is shown in FIG. 6a and indictaed generally by the numeral 150. Several layers of the food product are positioned in the freezing molds and solidified into a block. Transportation of the blocks to the processing plants, as well as expansion due to freezing will result in a slight bulge in the middle of the block and a thinner cross-sectional area at the corners. With this configuration transverse cuts through the block will result in end portions which are undersize, as well as variations in the net weight of each portion. Since a predetermined number of individual portions may be selected for the final packaged product it is important that the weight of each portion be carefully controlled in order to have a total overall weight conforming to the requirements of federal and local regulations. It is, therefore, desirable to have a frozen block having a uniform cross-sectional area throughout, as well as an overall length proportioned to a number of predetermined transverse cuts.

Application of compressive forces alone to equalize the cross-sectional area and remove the bulge in the middle of a block has resulted in shattering according to a pattern of cleavages disposed at an angle of approximately 45 degrees. In the three-dimensional sizing cavity provided within the apparatus of the present embodiment the block is confined on all sides during the application of the compressive forces. In this manner the block is permitted to expand or grow along the narrower end abutting the movable end wall member backed up by an air actuating member. During the application of compressive forces the frozen mass will flow within the confined area to conform to a uniform cross-sectional area. As soon as the compressive forces are released the block hardens to maintain the new dimensions without any shattering or development of cleavage lines. In the practice of the invention a temperature range of $+10°$ F. to $-5°$ F. has been found to be a suitable temperature.

In FIG. 6b it will be noted that the frozen block has been reduced in width and height while the length has been extended along the side indicated by numeral 152. An illustrative frozen block utilized in the production of fish sticks generally measures 10⅝ in width, 20¼ in length and 1¹¹⁄₁₆ in height. After sizing, the width and height dimensions are reduced to 10½ and 1⁹⁄₁₆ respectively while the overall length is extended approximately ⅜ to ½ inch. As a result of the new dimensions an additional transverse cut will be available at the end, to thereby eliminate excess waste. In the sizing operation a 250 ton press capable of applying a compressive force of 1000 pounds per square inch or more was utilized with satisfactory results. The final sized block has a uniform cross-sectional area with the bulge in the middle eliminated and the areas in the corners conforming with the rest of the block.

A plurality of irregularly formed blocks are stacked in the hopper 8, reference being again directed to FIG. 4. The lowermost block is moved horizontally by the pusher member 72 activated by the sliding carriage assembly 18. The pressure seal assembly 74 engages the side wall of the block and maintains same within the sizing cavity. Stops 78 disposed within the notches 76 contact positioning blocks 96 and 98 to prevent the escape of any of the frozen food mass upon softening during the sizing operation. End wall members 92 and 94 are in a fixed position within the die member while gate member 56 seals the other sidewall of the block at the time the press platen member 4 is moving upwards. During the application of the maximum compressive force the block is confined on all sides, with the growth of same being taken up by the movement in the end wall member 94. The pressure seal assemblies 74, 102 and 104 disposed on the sides of the block contain the liquefied frozen mass and rapid solidification will follow upon reversal of the compression stroke of the press means. The seal assemblies, therefore may be frost bonded to the sides of the block. The spring actuating members within each seal assembly provide for the release of this bond and the return of the right angular edge to the pre-sizing position.

Upon completion of the sizing the press platen member 4 descends thereby removing gate member 56. During this cycle of the operation the pusher member 72 has retracted and is picking up the next block to be sized. Upon the introduction of the next block the one disposed within the sizing cavity is discharged through the opening 88 and may be transported by a conventional conveyor belt to the next operation. A slightly inclined plane is shown along the lower wall of the discharge opening 88 to facilitate removal of the sized block after completion of the overall operation. Suitable valve controls for the air-actuating members 22 and 106 as well as cylinders 40, are of the conventional type and are indicated by the symbol V in FIGS. 1 and 3.

There is thus disclosed a new and unique method, as well as apparatus for the sizing of frozen blocks of food products without any resultant shattering or deterioration of a food flavor. The selection of the sized dimensions in accordance to the total new weight of the final packaged product for consumption will result in the elimination of excessive waste in blocks not having a uniform cross-sectional area.

The sizing operation may be practiced in any desired dimension of the frozen blocks. For example, the die member may be altered to permit the compression to be exerted sideways with resultant expansion in thickness and/or length. Similarly compressive forces may be exerted on the ends of the block to permit expansion in thickness and/or width. In addition compression may be exerted simultaneously on four sides with resultant expansion on the remaining two sides. Hence, by compression of the thickness and length, adjustment of the width dimension may be realized while compression of the width and length simultaneously will alter the thickness dimension. With the accurate sizing of a frozen block it will be possible to improve the mechanization of all subsequent processing operations, such as cutting and slicing the individual portions.

While a specific embodiment of the invention has been illustrated and described herein, it will be evident that various modifications and alterations may be practiced without departing from the spirit and scope of the invention as defined in the appended claims.

What is claimed is:

1. Apparatus for the sizing of frozen blocks of a food product comprising a die member having a top and bottom wall member at least one of which is movable, spaced side and end wall members defining with said top and bottom wall members a three-dimensional confining cavity, one of said side wall members being horizontally movable to engage and position a frozen block within the confining cavity, air actuating means for activating said movable side wall member, a pressure seal assembly disposed along the inner wall surface of said movable side wall member and said end wall members, said pressure seal assembly comprising a spring loaded rocker member defining a substantially right angular edge, each of said inner wall surfaces defining an arcuate portion with said rocker member being disposed therein and adapted to move curvilinearly with the right angular edge simultaneously engaging a side of said frozen block and an adjacent wall surface of said die member, and means for exerting a compressive force to one of said top and bottom wall members with the other being maintained stationary to deform the frozen block to completely fill the area of said cavity.

2. Apparatus according to claim 1 wherein at least one of said end wall members is provided with a movable portion to provide for expansion of the frozen block in a direction at right angles to the direction of the compressive force.

3. Apparatus according to claim 1 wherein one side wall member is mounted on said compression exerting means and is adapted to move into and out of the confining cavity in the direction of the applied compressive force.

References Cited by the Examiner

UNITED STATES PATENTS

| | | | |
|---|---|---|---|
| 2,043,366 | 6/36 | Bech | 100—232 |
| 2,186,495 | 1/40 | Pierson | 100—232 |
| 2,229,862 | 1/41 | Menges | 100—232 |
| 2,850,966 | 9/58 | Dohm | 100—232 |
| 2,880,330 | 4/59 | Cranke | 100—232 |

FOREIGN PATENTS 993,330   7/51   France.

WALTER A. SCHEEL, *Primary Examiner.*